United States Patent
Portal et al.

(10) Patent No.: US 7,809,988 B1
(45) Date of Patent: Oct. 5, 2010

(54) TEST ENVIRONMENT HAVING SYNCHRONOUS AND ASYNCHRONOUS DISTRIBUTED TESTING

(75) Inventors: Christian A. Portal, Holliston, MA (US); Michael J. Thomas, Framingham, MA (US)

(73) Assignee: The Mathworks, Inc., Natick, MA (US)

( * ) Notice: Subject to any disclaimer, the term of this patent is extended or adjusted under 35 U.S.C. 154(b) by 734 days.

(21) Appl. No.: 11/647,360

(22) Filed: Dec. 29, 2006

(51) Int. Cl.
*G06F 11/00* (2006.01)
*G06F 11/36* (2006.01)
(52) U.S. Cl. .............................. 714/38; 714/35; 714/37
(58) Field of Classification Search ..................... 714/4, 714/34, 38, 43, 35, 37; 717/124–133
See application file for complete search history.

(56) References Cited

U.S. PATENT DOCUMENTS

| | | | | |
|---|---|---|---|---|
| 5,544,310 A * | 8/1996 | Forman et al. | ................. | 714/31 |
| 5,751,941 A * | 5/1998 | Hinds et al. | ..................... | 714/38 |
| 6,304,982 B1 * | 10/2001 | Mongan et al. | ............... | 714/38 |
| 6,449,744 B1 * | 9/2002 | Hansen | ........................ | 714/738 |
| 6,851,075 B2 * | 2/2005 | Ur et al. | ........................ | 714/36 |
| 7,032,133 B1 * | 4/2006 | Lang et al. | ..................... | 714/33 |
| 7,089,534 B2 * | 8/2006 | Hartman et al. | ............. | 717/125 |
| 7,334,162 B1 * | 2/2008 | Vakrat et al. | ................... | 714/38 |
| 7,395,526 B2 * | 7/2008 | Arcand | ........................ | 717/127 |
| 7,454,659 B1 * | 11/2008 | Gaudette et al. | .............. | 714/33 |
| 7,543,184 B2 * | 6/2009 | Dean et al. | ..................... | 714/32 |
| 2005/0114737 A1 * | 5/2005 | Hughes et al. | ................ | 714/38 |
| 2005/0223362 A1 * | 10/2005 | Whitlock et al. | ............ | 717/126 |
| 2006/0218446 A1 * | 9/2006 | Crawford | ..................... | 714/38 |
| 2007/0168734 A1 * | 7/2007 | Vasile | .......................... | 714/33 |

OTHER PUBLICATIONS

Wikipedia's Configuration File version from Nov. 26, 2006 http://en.wikipedia.org/w/index.php?title=Configuration_file&oldid=90320545.* http://www.mathworks.com/access/helpdesk/help/toolbox/distcomp, last accessed Mar. 6, 2007.

* cited by examiner

*Primary Examiner*—Scott T Baderman
*Assistant Examiner*—Joseph Schell
(74) *Attorney, Agent, or Firm*—Venable LLP; Michael A. Sartori; Kyle D. Petaja

(57) ABSTRACT

In a computer-implemented method for running a test, the test to test a system under test is generated. At least a portion of the test is designated to be run as a distributed test. The designated test portion is selected to be run in one of a synchronous execution mode or an asynchronous execution mode. Tasks of the generated test are distributed to a plurality of workers. The distributed tasks are run with the plurality of workers according to the execution mode selection.

32 Claims, 8 Drawing Sheets

TEST ENVIRONMENT HAVING SYNCHRONOUS AND ASYNCHRONOUS DISTRIBUTED TESTING

BACKGROUND

The following relates generally to distributed testing in a test environment.

Typically, a test engineer develops a test to test operation of a unit, system or software file under controlled conditions. Test engineers interested in developing test programs often need to interface with an instrument to test the instrument itself, use the instrument to test a unit under test, or incorporate live measured data from the instrument into a test.

Another example of a test is the verification and validation of a system modeled in software. In such a scenario, a system designer often models a physical system or component in software to explore design ideas and parameters. A test may be used to verify different design iterations meet specific design requirements that must be satisfied. For example, a test engineer may use a computing environment to generate and optimally configure the test.

Once a test is generated and the test configuration is determined, the test may be executed. During the test execution, the data collected by the test instruments are read into the system. Data computations and data analysis may be performed during or after the data acquisition. In some systems, the data is visualized during acquisition to help the user or test engineer to fine-tune the test setup. The test and measurement process does not typically end once the data is captured or the test is run. After the completion of test, the collected data may be analyzed or modeled. Presentation-quality reports and graphics of the results may be created and presented to the end user.

Such testing and data analysis may involve a significant amount of computer time.

SUMMARY

One exemplary embodiment may be a computer-implemented method for running a test. A test may be generated to test a system under test. At least a portion of the test may be designated to be run as a distributed test. The designated test portion may be selected to be run in one of a synchronous execution mode or an asynchronous execution mode. Tasks of the generated test may be distributed to a plurality of workers. The distributed tasks may be executed with the plurality of workers according to the execution mode selection.

Another exemplary embodiment may be a system for running a test. A means may generate a test to test a system under test. A means may designate at least a portion of the test to be run as a distributed test. A means may select the test portion to be run in one of a synchronous execution mode or an asynchronous execution mode. A means may distribute tasks of the generated test to a plurality of workers and run the distributed tasks with the plurality of workers according to the execution mode selection.

Further features of the exemplary embodiments, as well as the structure and operation of various exemplary embodiments, are described in detail below with reference to the accompanying drawings.

BRIEF DESCRIPTION OF THE DRAWINGS

The foregoing and other features of the exemplary embodiments will be apparent from the following, more particular description of exemplary embodiments, as illustrated in the accompanying drawings wherein like reference numbers generally indicate identical, functionally similar, and/or structurally similar elements. The left most digits in the corresponding reference number indicate the drawing in which an element first appears.

DEFINITIONS

Figure 1:
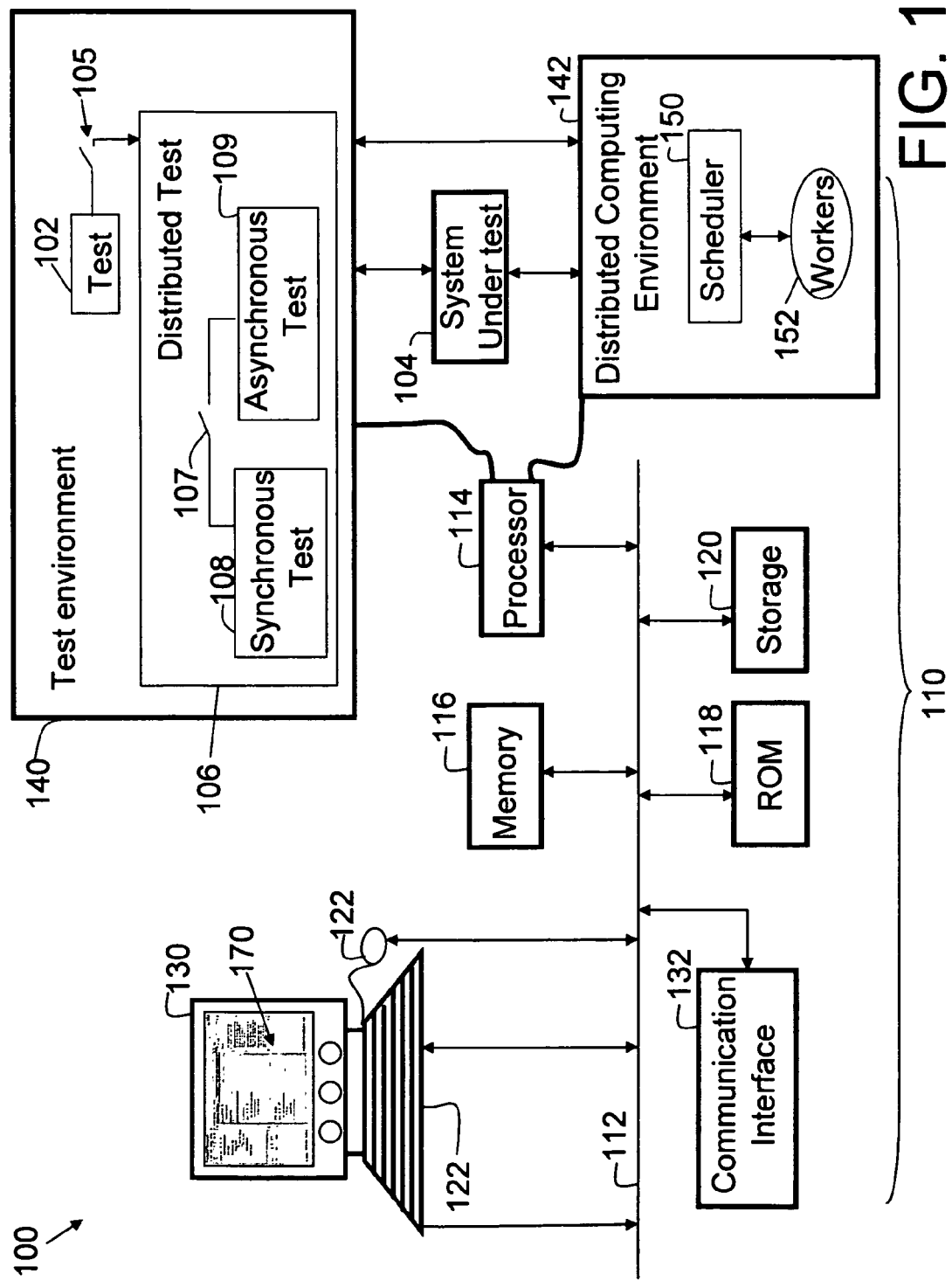
FIG. 1 illustrates an exemplary configuration for an exemplary embodiment.

In describing the exemplary embodiments, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

A "computing environment" may refer to a software environment, which allows for technical computing. A computing environment may be textual and/or graphical. Exemplary embodiments may exist as part of a textual technical computing environment such as MATLAB® by The MathWorks, Inc. of Natick, Mass., MATHEMATICA® by Wolfram Research, or COMSOL® Script by Comsol, Inc. The techniques described herein may be embodied in functional components, such as, for example, in a function, a model, a class, or other program element. Exemplary embodiments may exist as part of a technical computing environment that has graphical models, such as SIMULINK® and STATEFLOW® by The MathWorks, Inc. of Natick, Mass., or LABVIEW® by National Instruments Corporation. The techniques described herein may be embodied in functional components of such a computing environment, such as, for example, in a simulation block, or in simulation toolset.

"Distributed computing environment" may refer to the dynamic distribution of computing tasks from a client to remote workers for execution of the tasks on multiple computer systems. A task may refer to one segment of a job to be evaluated by a worker.

"Synchronous test mode" may refer to a mode where control over the test environment is not provided to the user until the test execution is completed.

"Asynchronous test mode" may refer to a mode where control over the test environment is provided to the user while the test is being executed.

DETAILED DESCRIPTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the exemplary embodiments are not intended to be limited to the specific terminology so selected. A person skilled in the relevant art will recognize that other components and configurations may be used without parting from the spirit and scope of the exemplary embodiments. It is to be understood that each specific element includes all technical equivalents that operate in a similar manner to accomplish a similar purpose. Each reference cited herein is incorporated by reference. The examples and embodiments described herein are non-limiting examples.

With reference to FIG. 1, an exemplary system 100 may run a test 102 for a system under test or a simulation model of a system under test 104. The system under test 104 may be, for example, a unit under test such as a hardware device, a software algorithm, software files, a system model, software coverage testing, software testing with stubs, and the like. The simulation model of the system under test 104 may be written in a matrix-based mathematical programming language such as MATLAB® by The MathWorks, Inc. of Natick, Mass. or a graphical programming environment for system models such as SIMULINK® by The MathWorks, Inc. of Natick, Mass. For example, a portion of the test 102 may be selected by a user via a switch 105 or designated by default to be run as a distributed test 106. The selected portion may be equal to or less than the entire test 102. As discussed in a greater detail below, the distributed test 106 may be selected by a user via a switch 107 or designated by default to run in a synchronous execution mode as a synchronous distributed test 108 or an asynchronous execution mode as an asynchronous distributed test 109.

With continuing reference to FIG. 1, the system 100 may include an exemplary computer 110 which may include a bus 112, a processor 114, a computer-readable medium or memory 116, a read only memory (ROM) 118, a storage device 120, an input device 122, an output device 130, and a communication interface 132. The exemplary system 100 may include a client or client session such as a test environment 140 interacting with a distributed computing environment 142. For example, the test environment 140 may be considered to be a client of the distributed computing environment 142. The distributed computing environment 142 may include a scheduler 150 and computing resource(s) or worker(s) 152. The scheduler 150 can be any third-party generic scheduler. The scheduler 150 may receive other jobs from other clients of the distributed computing environment 142 and process the received jobs using the computing resources or workers 152. A number of workers 152 may be 1, 2, 3, 4, 5, . . . , 10, . . . , 20, etc. In an alternative embodiment, the system 100 may include several schedulers and client sessions. For example, any client or client session can create, run, and access jobs on any scheduler. In one embodiment, each worker 152 is registered with and dedicated to only one scheduler 150 at a time. The scheduler 150 may receive the distributed test 106 from the test environment 140 and process the distributed test 106 as one or more jobs using multiple computing resources (i.e., the workers 152).

Although a single processor is shown for simplicity of illustration to include the test environment, workers, and scheduler, other implementations of the exemplary embodiment are contemplated. For example, in an exemplary embodiment, the test environment 140 may be implemented on a first computer, and the distributed computing environment 142 may be implemented on a first computer system. In the first computer system, the scheduler 150 may be implemented on a second computer, and each worker 152 may be implemented on a separate computer. As another example, in an exemplary embodiment, the test environment 140 may be implemented on a first computer, and the distributed computing environment 142 may be implemented on a second computer having multiple processors. Each worker 152 may be implemented on a separate processor of the second computer. As another example, in an exemplary embodiment, the test environment 140 and the distributed computing environment 142 may both be implemented on a first computer having multiple processors. Each worker 152 may be implemented on a separate processor of the first computer. Of course, it is contemplated that the processor may include a multi-core processor.

In an exemplary embodiment, the system under test 104 may be a part of or connected to a computer implementing the test environment 140.

The bus 112 may include one or more interconnects that permit communication among the components of the computer 110. The processor 114 may include any type of processor, microprocessor, multi-core processor, or processing logic that may interpret and execute instructions. The memory 116 may include a random access memory (RAM) or another type of dynamic storage device that may store information and instructions for execution by the processor 114. The memory 116 may also be used to store temporary variables or other intermediate information during execution of instructions by the processor 114.

The ROM 118 may include a ROM device and/or another type of static storage device that may store static information and instructions for the processor 114. The storage device 120 may include a magnetic disk and/or optical disk and its corresponding drive for storing information and/or instructions. The storage device 120 may include a single storage device or multiple storage devices, such as multiple storage devices operating in parallel. Moreover, the storage device 120 may reside locally on the computer 110 and/or may be remote with respect to the computer 110 and connected to the computer 110 via a network and/or another type of connection, such as a dedicated link or channel. For example, the storage device 120 may store code for the operating system (OS) of the computer 110, and code for applications running on the operating system.

The input device 122 may include any mechanism or combination of mechanisms that permit an operator or user to input information to the computer 110, such as a keyboard, a mouse, a touch sensitive display device, a microphone, a pen-based pointing device, and/or a biometric input device, such as a voice recognition device and/or a finger print scanning device. The computer 110 may receive through the input device 122 input data necessary for running the test 102.

The output device 130 may include any mechanism or combination of mechanisms that outputs information to the operator, including a display, a printer, a speaker, etc. User interface screen or screens 170 facilitate display and entry of the data on the display 130. For example, the user may select a test to run as a distributed test on the user interface screen or screens 170. As another example, the user may select or designate the distributed test 106 to run as the synchronous test 108 or asynchronous test 109 on the user interface screen 170.

The communication interface 132 may include any transceiver like mechanism that enables the computer 110 to communicate with other devices and/or systems, such as client computers. For example, the communication interface 132 may include one or more interfaces. Alternatively, the communication interface 132 may include other mechanisms for communicating via a network, such as a wireless network. In one implementation, the communication interface 132 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

The computer 110 may perform certain functions in response to the processor 114 executing software instructions included in the computer-readable medium, such as memory 116. In alternative embodiments, hardwired circuitry may be used in place of or in combination with software instructions to implement features consistent with principles of the exemplary embodiments. Thus, implementations consistent with principles of the application are not limited to any specific combination of hardware circuitry and software.

Figure 2:
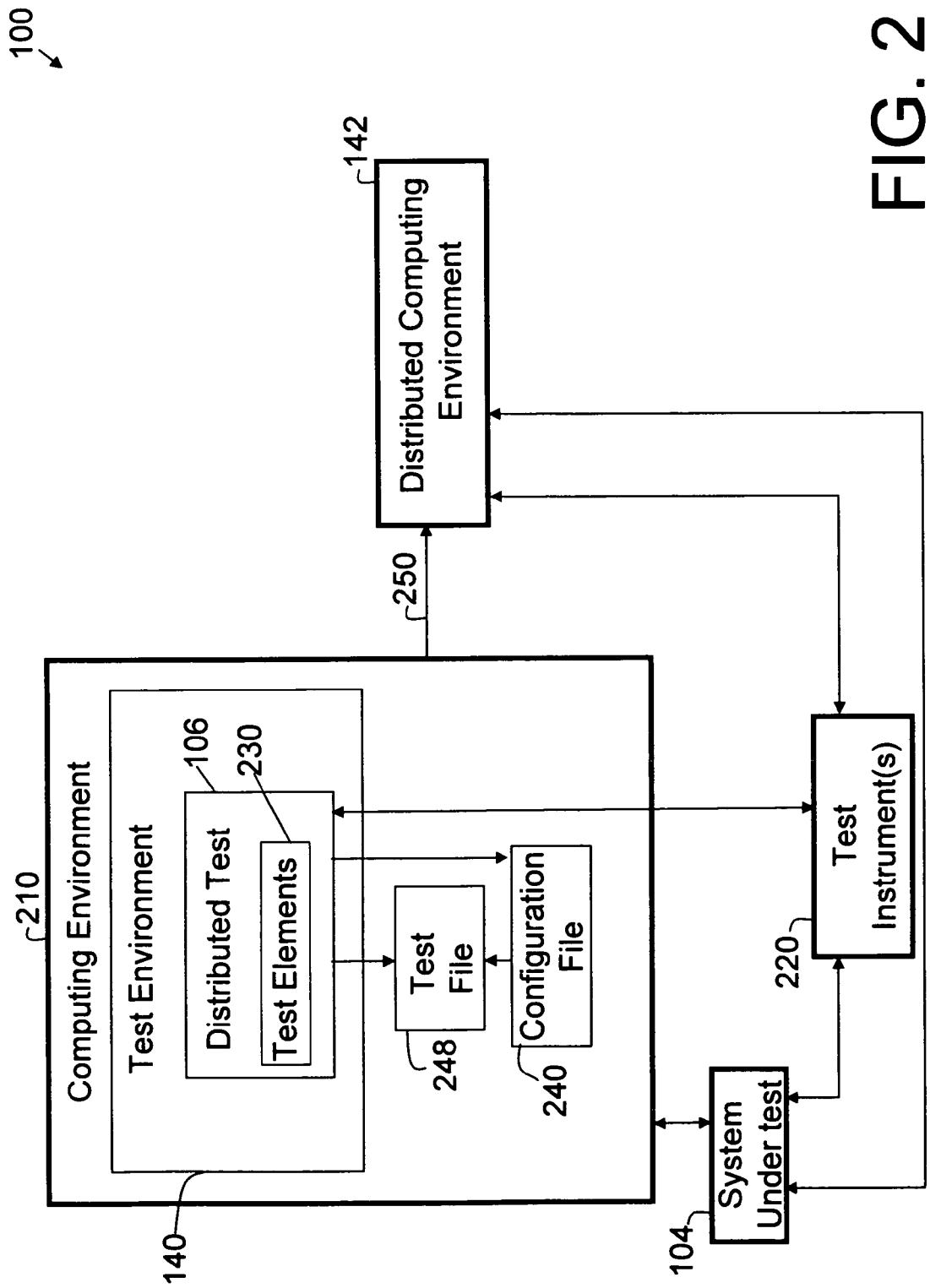
FIG. 2 illustrates a detailed portion of an exemplary test environment configuration for an exemplary embodiment.

With continuing reference to FIG. 1 and further reference to FIG. 2, the test environment 140 of a computing environment 210 may be used to develop and configure the test 102 or the distributed test 106 for the system under test 104. The test environment 140 may be based on, for example, SystemTest by The MathWorks, Inc. of Natick, Mass. The distributed computing environment 142 may be based on Distributed Computing Toolbox by The MathWorks, Inc. of Natick, Mass. The distributed test 106 may interact with one or more test instruments 220, which may interact with the system under test 104. For example, the test instrument may be an oscilloscope, a function generator, a power supply, and/or any other test equipment. In an exemplary embodiment, the test instrument(s) 220 may be part of or connected to a computer implementing the test environment 140. An example of the instrument 220 includes a TDS oscilloscope available from Tektronix of Beaverton, Oreg. which may be interfaced with the computer 110 via a general purpose interface bus (GPIB) interface such as, for example, a GPIB board by Capital Equipment Corp. of Norton, Mass. or a GPIB board by Keithley Instruments Inc. of Cleveland, Ohio. The distributed test 106 may include multiple parts, such as, for example described below, a pre-test section, an iterations part, a main test section, a save results part, and a post test section. Test elements 230 may be added to the various sections of the distributed test 106 by the test environment 140 or by the user/test engineer. The test elements 230 may determine what actions the distributed test 106 performs. As an example, the test elements 230 may include: connecting to the instrument 220; collecting data from the instrument 220; comparing the collected data to known criteria; disconnecting from the instrument 220. As a further example, the test elements 230 may include: initiating test software; collecting data from the test software; comparing the collected data to known criteria; and closing the test software.

A configuration file 240 for the distributed test 106 may be specified as a default. The default configuration file may be identified in the computing environment 210 based on predetermined criteria. As another example, the configuration file 240 for the distributed test 106 may be specified with input from a user or test engineer via the user interface screen 170. For example, the user may be presented with a list of configuration files that may include configuration files which exist in the computing environment 210. Alternatively, the list of configuration files may include configuration files which are identified within the computing environment 210 based on predetermined criteria. The configuration file 240 may identify properties of the distributed computing environment 142. Exemplary properties of the distributed computing environment 142 that may be identified with the configuration file 240 may include one or more properties of one or more computing resources such as type, name, hostname, and/or uniform resource locator (URL); one or more properties of one or more schedulers such as data location, share file system, cluster root, argument submission, and/or function submission; one or more properties of one or more jobs such as path dependencies, file dependencies, timeout, restart, maximum number of workers 152 in the distributed computing environment 142, and/or minimum number of workers 152 in the distributed computing environment 142; and properties of tasks such as timeout, output of command window, and/or task finished indicator. For example, various parameters of the configuration file 240 may be entered in the exemplary graphical user interface, as described in detail below. The generated distributed test 106 may be saved as an existing test file or a new test file 248 in the test environment 140. Although the test generating and configuring is described regarding the distributed test, the described above equally relates to a regular test.

After the distributed test 106 is generated, the distributed test 106 and the specified configuration file 240 may be passed 250 from the test environment 140 to the distributed computing environment 142. If the distributed computing environment 142 is not already initiated, the passing 250 of the distributed test 106 may cause the distributed computing environment 142 to be initiated. The distributed computing environment 142 may have access to the system under test 104 and any test instruments 220.

Figure 3:
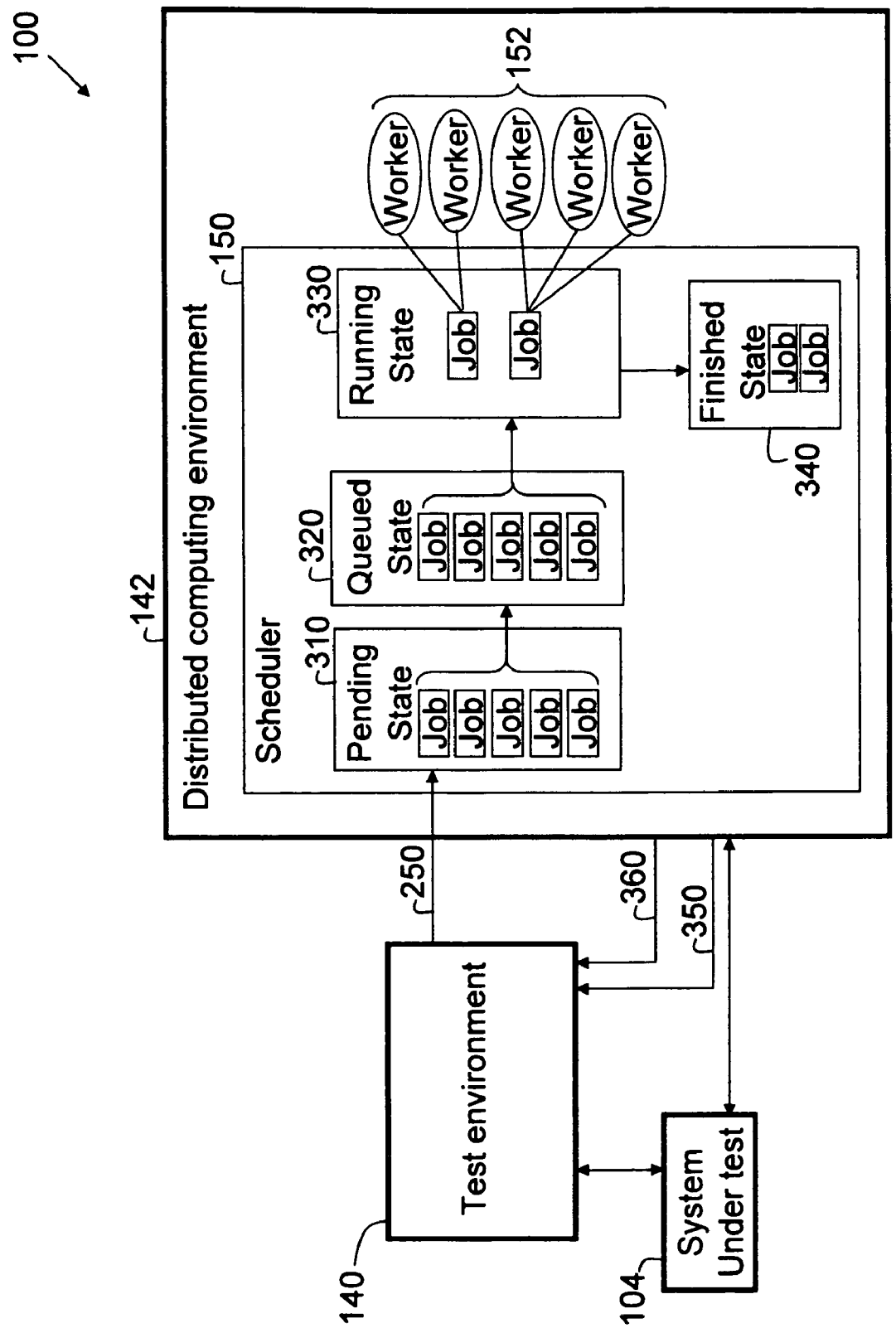
FIG. 3 illustrates a detailed portion of an exemplary distributed computing environment configuration for an exemplary embodiment.

With continuing reference to FIG. 1 and further reference to FIG. 3, the scheduler 150 may process each job using four states, a pending state 310, a queued state 320, a running state 330, and a finished state 340. In the pending state 310, which is the first state of each job, a job may be created by the client, e.g. the test environment 140, and transferred to the distributed computing environment 142. A job is a logical unit of activities, or tasks that are processed and/or managed collectively. A task defines a command, such as, for example, a command compatible with MATLAB®, SIMULINK®, or SystemTest (by The MathWorks, Inc. of Natick, Mass.) command, to be executed, and the number of arguments and any input data to the arguments. In an alternative embodiment, a command may represent a command or a function of any computing language, such as C, C++, Java, Perl, Python, etc. A job is a group of one or more tasks. In one embodiment, the tasks are directly distributed by the test environment 140 to the workers 152. The worker 152 may perform a task and may return a result to the test environment 140. Tasks may be added to the job while in the pending state 310. A job may be transferred from the pending state 310 to the queued state 320 when the job is submitted for processing. The jobs in the queued state 320 may be executed by the scheduler 150 in the order in which the jobs are submitted, e.g. using a first-in-first-out queue ordering. Jobs in the queue may be re-ordered, e.g. the jobs in the queue may be promoted, demoted, canceled, or destroyed. In an alternative embodiment, different job scheduling algorithms may be employed, such as, for example, job ranking, probabilistic scheduling, multiple-level scheduling, scheduling based on resource needs and availability, etc.

When a job reaches the top of the queue, the job is transferred from the queued state 320 to the running state 330. In the running state 330, the scheduler 150 distributes the tasks of the job to the workers 152 for processing. Each worker 152 is given a task from the running job by the scheduler 150, executes the task, returns the result to the scheduler, and then is given another task. When all tasks for a running job have been assigned to the workers 152, the scheduler 150 starts running the next job when the next worker becomes available.

If more workers are available than is necessary for tasks of a job, the scheduler 150 may begin to execute the next job from the queued state 320. As such, more than one job may be running at a time. In an alternative embodiment, more than one task/job may be assigned to one worker at the same time.

In yet another embodiment, multiple jobs may be scheduled and processed at the same time.

When the job's tasks are finished processing, the job is moved from the running state 330 to the finished state 340. As tasks of a job are finished, the distributed computing environment 142 may provide results of the job to the client that submitted the job to the distributed computing environment 142. In the embodiment of FIG. 3, results 350 may be provided to the test environment 140. Depending on the design of the scheduler 150, as tasks of a job are finished, the distributed computing environment 142 may provide a running status of the job to the client that submitted the job to the distributed computing environment 142. In the embodiment of FIG. 3, a running status 360 may be provided to the test environment 140.

Figure 4:
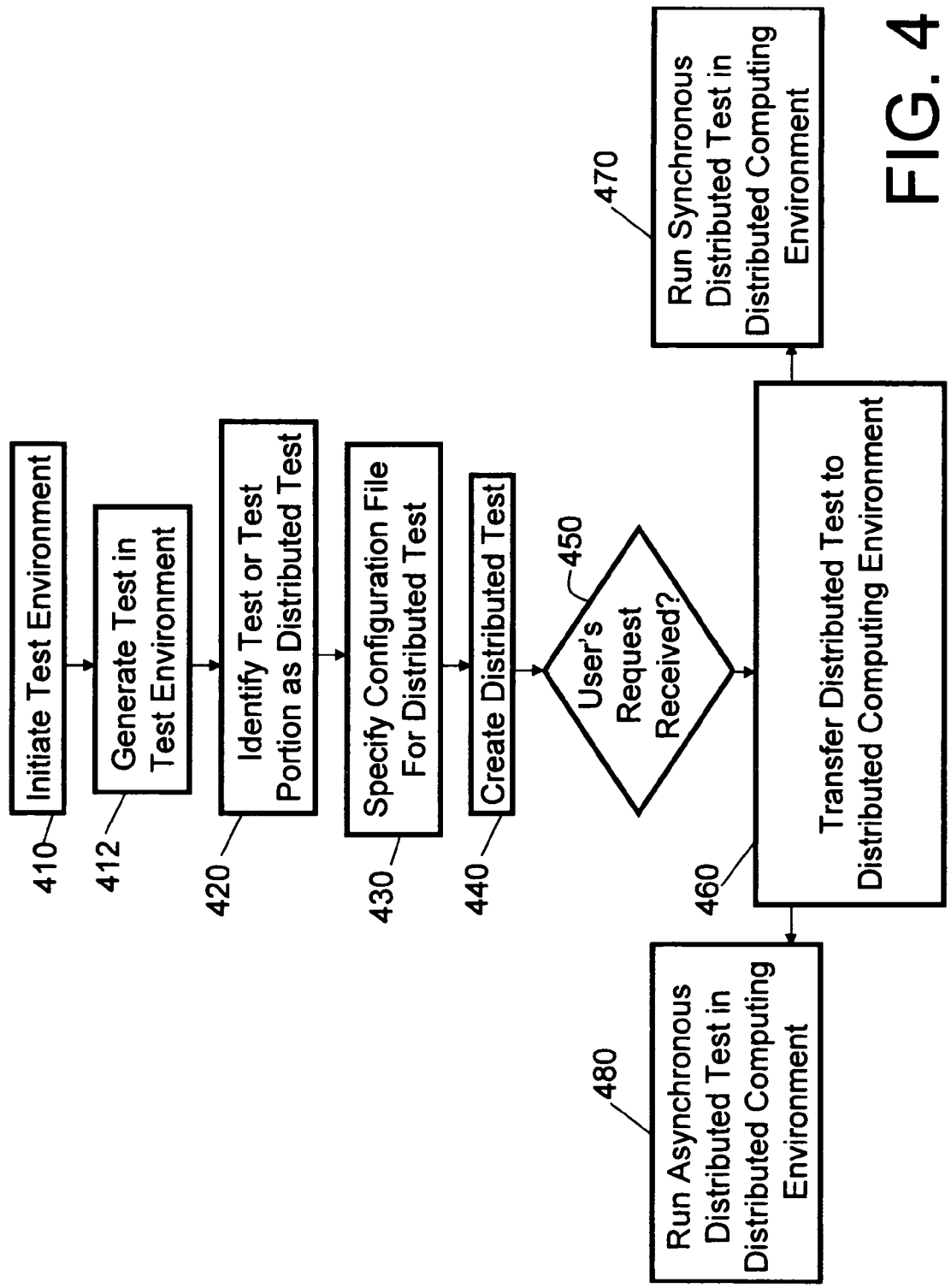
FIG. 4 illustrates a portion of a flowchart for initiating and configuring a distributed test in an exemplary embodiment.

With continuing reference to FIGS. 1 and 3 and further reference to FIG. 4, in block 410, the test environment 140 may be initiated on a computer. In block 412, the test 102 may be generated. In block 420, the test 102 or portion of the test 102 may be identified as the distributed test 106. The identification of the distributed test 106 may be performed automatically for the user, or the user may be able to specify it. In block 430, the configuration file 240 for the distributed test 106 may be specified. In block 440, the distributed test is created. If the user's request to run the test is received in block 450, in block 460, the distributed test 106 may be transferred to the distributed computing environment 142 for execution in a synchronous execution mode as a synchronous distributed test or an asynchronous execution mode as an asynchronous distributed test. Optionally, the test environment 140 may be closed. From block 460, if the distributed test 106 is to be run as a synchronous distributed test, flow proceeds to block 470. Otherwise, if the distributed test 106 is to be run as an asynchronous distributed test for a better utilization of resources, flow proceeds to block 480.

Figure 5:
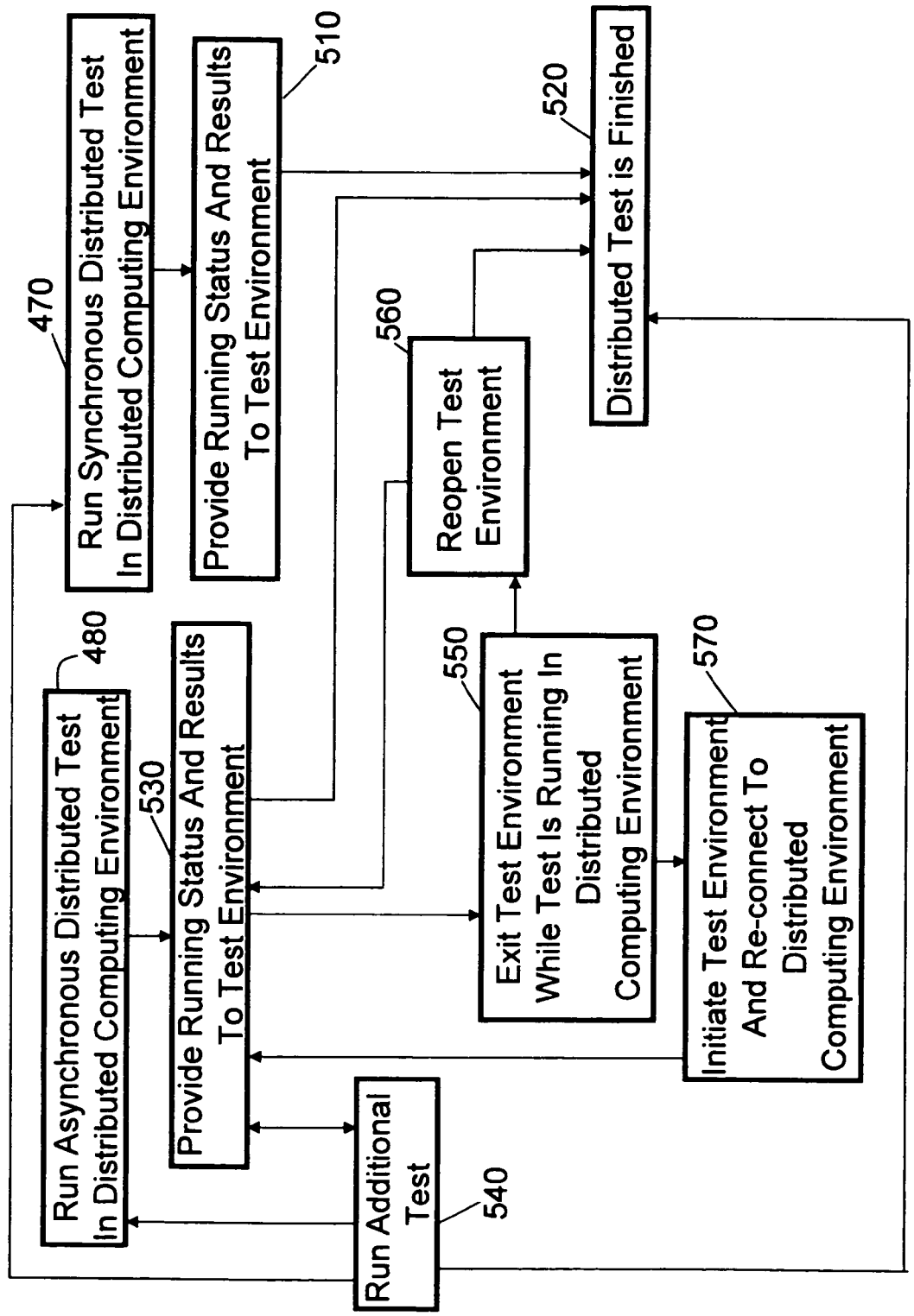
FIG. 5 illustrates another portion of a flowchart for executing a distributed test in an exemplary embodiment.

With continuing reference to FIG. 3 and further reference to FIG. 5, in block 470, the distributed test 106 is run as a synchronous distributed test in the distributed computing environment 142. The distributed computing environment 142 may run the distributed test 106 as a job from a client, as discussed above.

In block 510, depending on the design of the scheduler 150, the results 350 from running the distributed test 106 and/or the running status 360 of the distributed test 106 may be provided to the test environment 140 as the results 350 and/or the running status 360 are made available by the distributed computing environment 142. When the distributed test 106 is run as a synchronous distributed test, the test environment 140 may not submit additional jobs to the distributed computing environment 142. When the synchronous distributed test is complete, flow proceeds to block 520.

In block 480, the distributed test 106 is run as an asynchronous distributed test in the distributed computing environment 142. In block 530, depending on the design of the scheduler 150, the results 350 from running the distributed test 106 and/or the running status 360 of the distributed test 106 may be provided to the test environment 140 as the results 350 and/or running status 360 are made available by the distributed computing environment 142.

In optional block 540, a current distributed test 106 may be closed, a new distributed test 106 may be generated in the test environment 140 and transferred to be run in the distributed computing environment 142. If an additional synchronous test is added, flow proceeds to the block 470. If an additional asynchronous test is added, flow proceeds to the block 480. More than one additional asynchronous test may be created in the test environment 140 and may be transferred to the distributed computing environment 142 by looping between blocks 530 and 540.

In optional block 550, the test environment 140 may be exited, while the asynchronous test and any additional asynchronous tests continue running in the distributed computing environment 142. Other applications or environments may be initiated and run at this time by the computer that ran the test environment 140. In optional block 560, the test environment 140 may be reopened when the tests have been asynchronously distributed and/or the test environment 140 has been closed.

Figure 6:
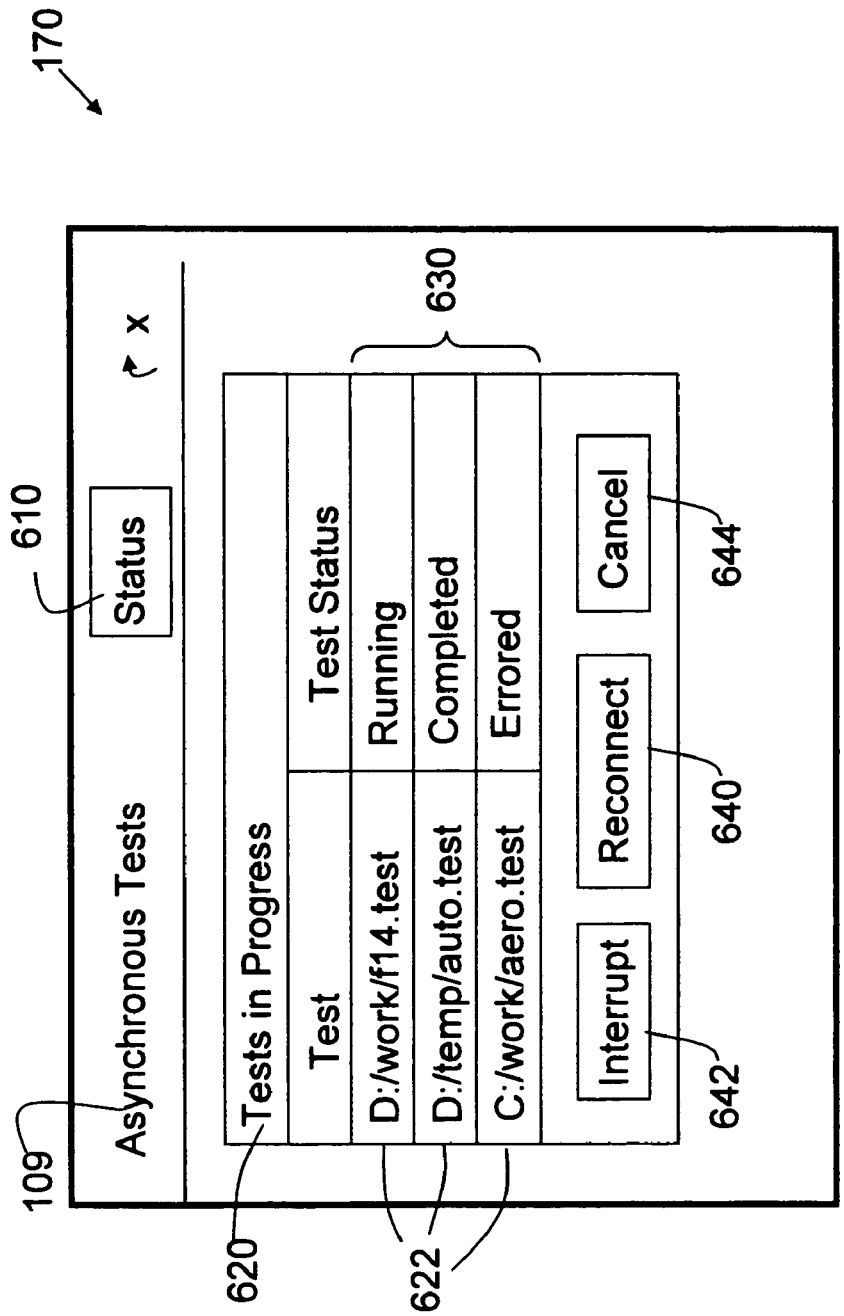
FIG. 6 illustrates an exemplary graphical user interface for an exemplary embodiment.

With continuing reference to FIGS. 1 and 5 and particular reference to FIG. 6, the user may request status of the asynchronous tests by pressing a button 610 on the interface screen 170. The user may be presented with a list of tests in progress 620 that have been distributed to the distributed computing environment 142. Each test 622 that has been distributed is displayed along with each test status 630. The user may select to reconnect 640 to a test, interrupt 642 any pending executions of the tests, or cancel 644 a test.

For example, when the distributed tasks have completed, the test may be reopened in the test environment 140. The post test section may be run. As another example, if the distributed tasks have not completed yet, the test may be reopened in the test environment 140. Run status and results may be provided to the test environment 140. As another example, if the distributed tasks encountered an error, the test may be reopened in the test environment 140. The post test section may be run. Run status may display error information. As another example, if the distributed tasks are interrupted such as when the test execution is terminated by the user, the test may be reopened in the test environment 140. The post test section may be run. Run status may display error or interrupt information.

If the test file becomes inaccessible to the test environment 140, the test cannot be reopened since it does not exist. Accordingly, the post test section cannot be run. A message dialog may be displayed on the user interface screen 170 indicating that the test is no longer available on the system 100.

An option may be provided to the user to have any results, provided by the distributed test environment 142, to be made available in the computing environment 210. While a test is being asynchronously executed, the test environment 140 may allow a user to operate on the test file that was just run. Such operations may include editing the test structure and saving the altered test as a new test file, canceling the test by pressing on the test environment's stop button, closing and reopening the test file, and re-running the same test asynchronously to produce multiple runs of the same test.

In one embodiment, in order for the test environment to be able to associate a distributed test with a corresponding test file, a job file may be created by the test environment in the user's preferences directory. This job file could be a text file containing a mapping of job IDs with test file paths. The job file may be updated whenever a test is run by the test environment or whenever a distributed test completes, or at random intervals as necessary.

With continuing reference to FIGS. 1 and 5, in optional block 570, the test environment 140 may be initiated by the test engineer who specifies the test. The test environment 140 and the distributed test 106 may be reconnected. Once the test environment 140 is initiated and re-connected, flow proceeds to block 530.

In block 520, the distributed test 106 is completed by the distributed computing environment 142. The results 350 of the distributed test 106 (and optional additional distributed tests) may be provided by the distributed computing environment 142 to the test environment 140. If any additional portion of the test 102 remains to be executed, the test environment 140 may execute the remaining portion. For example, a portion of the test 102 may not have been designated as the distributed test 106, and this undesignated portion may be run by the test environment 140. Once the test 102 is completed, the post test section may be run by the test environment 140.

Figure 7:
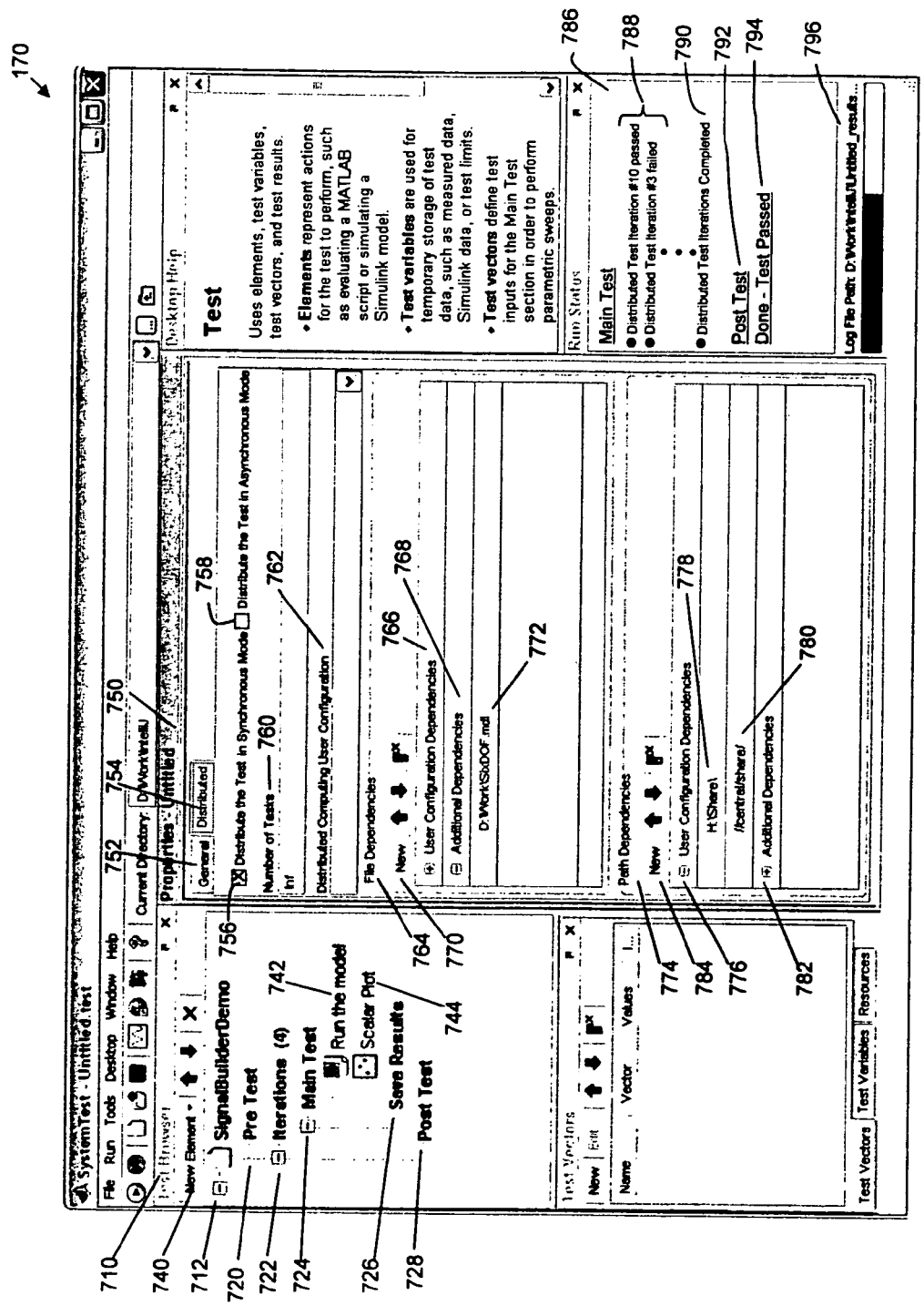
FIG. 7 illustrates another exemplary graphical user interface for an exemplary embodiment.

With continuing reference to FIG. 1 and further reference to FIG. 7, an exemplary graphical user interface 170 is illustrated for use by, for example, a test engineer or a user. In a test browser window 710, a test 712 may be generated. In the exemplary graphical user interface 170 of FIG. 7, the test 712 is labeled "SignalBuilderDemo." The test 712 may include a pre test section 720, an iterations part 722, a main test section 724, a save results part 726, and a post test section 728. The test browser 710 may be used to add (or delete) test elements to the various sections of the test, as for example, to the pre test section 720, the main test section 724, and the post test section 728. New test elements may be added via a menu 740. For example, the SIMULINK® test element labeled "Run the model" 742 and the plotting test element labeled "Scalar Plot" 744 are added to the main test section 724 of the test 712.

In a properties window 750 of the exemplary graphical user interface 170, properties of the test 712 designated to run may be displayed. The properties window 750 may include a general tab 752 for general properties of the test and a distributed tab 754 for distributed computing properties of the test 712. The distributed tab 754 may include buttons or windows 756, 758 for the test engineer to select the test 712 to run in a synchronous or an asynchronous mode. As shown, an "x" in the window 756 indicates that the test 712 is to be run in the synchronous mode.

As mentioned above, the user may enter parameters of the configuration file in the exemplary graphical user interface 170. For example, the job submitted may be broken into tasks. In area 760, the user may set up the number of tasks. As shown in FIG. 7, the area 760 displays "inf," which may indicate that the number of tasks defaults to the number of the workers 152 available to the scheduler 150 in the distributed computing environment 142. For example, a number of iterations to be run by the main test section 724 may be set to ten. If there are ten workers 152 available and the number of tasks is set to ten, each worker 152 runs a single iteration.

In area 762, the configuration file may be selected from a list of available configuration files. For example, the list of configuration files may include configuration files which exist within the computing environment. Alternatively, the list of configuration files may include configuration files which are identified within the system based on predetermined criteria. In area 764, file dependencies may be identified. File dependencies may refer to additional files, libraries, or data to be provided to the worker(s) 152 to run the test. In area 766, the file dependencies identified in the configuration file may be listed. In area 768, file dependencies may be added, deleted, and re-ordered using the menu 770. As shown, the file dependency "D:\Work\SixDOF.mdl" 772 is added in the area 768. In area 774, path dependencies may be identified. Path dependencies may refer to directories where the files, libraries, or data may be located to avoid moving multiple copies. In area 776, the path dependencies identified in the configuration file may be listed. As shown, the path dependency "H:\ Share\" 778 and the path dependency "//central/share/" 780 are added in the area 776 according to the configuration file listed in the area 762. In area 782, additional path dependencies may be added, deleted, and re-ordered using the menu 784.

A window 786 displays exemplary results and running status for an exemplary distributed test. Entries 788 indicate the status of the iterations 722 run in the main test section 724. Entry 790 indicates the completion of the iterations. Entry 792 indicates initiation of the post test 728. Entry 794 indicates that the test is finished and the test passed. Entry 796 indicates the log of the file name.

Figure 8:
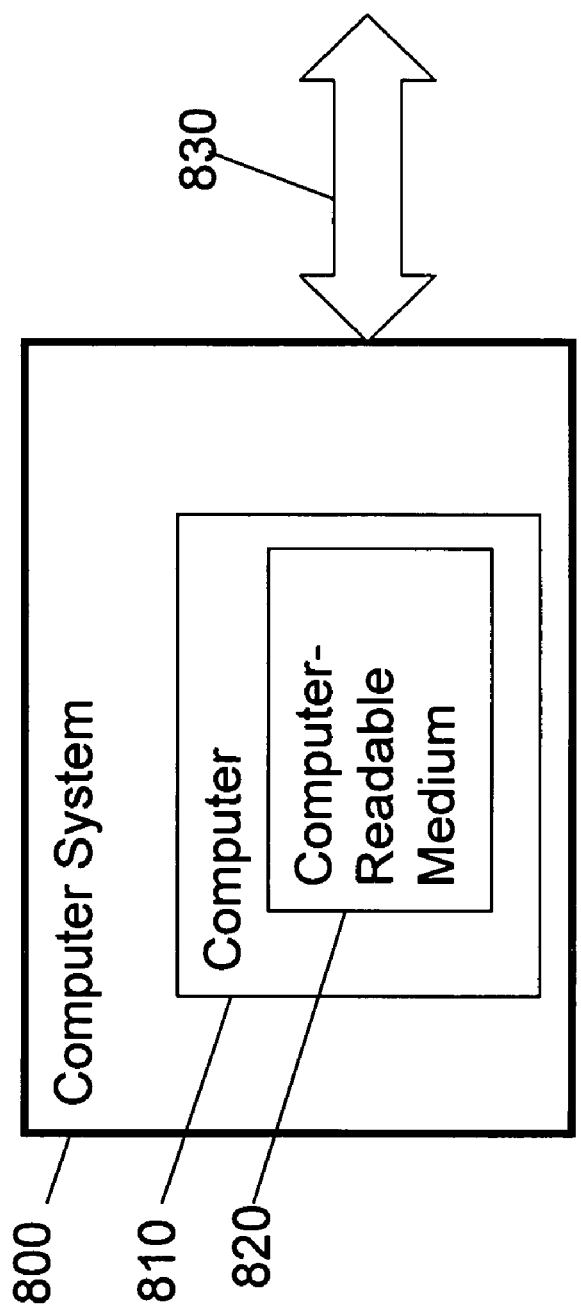
FIG. 8 depicts a computer system for use with the exemplary embodiments.

With continuing reference to FIG. 1 and further reference to FIG. 8, a computer system 800 may be used with the exemplary embodiments. The computer system 800 may include a computer 810 for implementing the exemplary embodiments. The computer 810 may include a computer-readable medium 820 embodying software for implementing the exemplary embodiments and/or software to operate the computer 810 in accordance with the exemplary embodiments. As an option, the computer system 800 may include a connection to a network 830. With this option, the computer 810 may be able to send and receive information (e.g., software, data, documents) from other computer systems via the network 830.

As discussed above, the computer 810 may implement the test environment 140, while another computer 810, or a computer system, similar to the computer system 800, may implement the distributed computing environment 142. In another exemplary embodiment, the computer 810 may implement the test environment 140 and distributed computing environment 142.

The present exemplary embodiments may be embodied in many different ways as a software component. For example, it may be a stand-alone software package, or it may be a software package incorporated as a "tool" in a larger software product, such as, for example, a mathematical analysis product or a system modeling product. It may be downloadable from a network, for example, a website, as a stand-alone product or as an add-in package for installation in an existing software application. It may also be available as a client-server software application, or as a web-enabled software application.

While various embodiments of the present exemplary embodiments have been described above, it should be understood that they have been presented by way of example only, and not limitation. Thus, the breadth and scope of the present exemplary embodiments should not be limited by any of the above-described exemplary embodiments, but should instead be defined only in accordance with the following claims and their equivalents.

What is claimed is:

1. A computer-implemented method for running a test, the method comprising:
   generating a test to test a system under test in a first environment, including:
      designating a first portion of the test to be run in the first environment;
      designating a second portion of the test to be run as a distributed test, and
      assigning the second portion to be run in one of a synchronous execution mode or an asynchronous execution mode;
   distributing the second portion to a plurality of workers in a second environment;
   running the second portion with the plurality of workers in the second environment according to the execution mode selection; and
   providing results of the running of the second portion to the first environment; wherein the second environment is not part of the first environment.

2. The method as set forth in claim 1, further comprising:
   providing a running status of running the second portion with the plurality of workers in the second environment according to the execution mode selection to the first environment.

3. The method as set forth in claim 1, further comprising:
   running the second portion with the plurality of workers in the asynchronous execution mode;
   selecting an additional test to be run as a distributed test in one of a synchronous execution mode or an asynchronous execution mode; and
   running the additional test according to the execution mode selection.

4. The method as set forth in claim 1, wherein the first environment comprises a test environment, and wherein the second environment comprises a distributed computing environment.

5. The method as set forth in claim 4, further comprising:
   exiting the test environment after the second portion of the generated test is distributed to the distributed computing environment; and
   running the second portion with the plurality of workers in the asynchronous execution mode.

6. The method as set forth in claim 5, further comprising:
   reopening the test environment;
   reconnecting to the test; and
   providing at least one of a running status or results of running the second portion with the plurality of workers in the distributed computing environment to the test environment from the distributed computing environment.

7. The method as set forth in claim 5, wherein running the second portion in the asynchronous execution mode comprises reopening the test environment after at least one of:
   the second portion of the generated test is distributed to the distributed computer environment;
   the distributed computer environment completed execution of the test;
   execution of the test encountered an error; and
   execution of the test is interrupted.

8. The method as set forth in claim 1, wherein designating the second portion is based on a default setting.

9. A method for testing a system, comprising:
   downloading software to a computer system, which software when executed by the computer system causes the computer system to perform operations comprising the method of claim 1.

10. A method for testing a system, comprising:
    providing software to download to a computer system, which software when executed by the computer system causes the computer system to perform operations comprising the method of claim 1.

11. The method of claim 1, wherein assigning the second portion to be run in one of the synchronous execution mode or the asynchronous execution mode is based on a default setting.

12. A computer-readable medium comprising software, which when executed by a computer system causes the computer system to perform operations for running a test, the operations comprising:
    generating a test to test a system under test in a first environment, including:
       designating a first portion of the test to be run in the first environment;

designating a second portion of the test to be run as a distributed test, and assigning the second portion to be run in one of a synchronous execution mode or an asynchronous execution mode;

distributing the second portion to a plurality of workers in a second environment;

running the second portion with the plurality of workers according to the execution mode selection in the second environment; and providing results of the running of the second portion to the first environment; wherein the second environment is not part of the first environment.

13. The computer-readable medium of claim 12, further comprising:

providing a running status of running the second portion with the plurality of workers according to the execution mode selection in the second environment to the first environment.

14. The computer-readable medium of claim 12, further comprising:

running the second portion with the plurality of workers in the asynchronous execution mode;

selecting an additional test to be run as a distributed test in one of a synchronous execution mode or an asynchronous execution mode; and running the additional test according to the execution mode selection.

15. The computer-readable medium of claim 12, wherein the first environment comprises a test environment, and wherein the second environment comprises a distributed computing environment.

16. The computer-readable medium of claim 15, further comprising:

exiting the test environment after the second portion of the generated test is distributed to the distributed computing environment; and running the second portion with the plurality of workers in the asynchronous execution mode.

17. The computer-readable medium of claim 16, further comprising:

reopening the test environment;

reconnecting to the test; and providing at least one of a running status or results of running the second portion with the plurality of workers according to the asynchronous execution mode to the test environment from the distributed computing environment.

18. The computer-readable medium of claim 16, wherein running the distributed tasks in the asynchronous execution mode comprises reopening the test environment after at least one of:

the second portion of the generated test is distributed to the distributed computer environment;

the distributed computer environment completed execution of the distributed tasks;

execution of the distributed tasks encountered an error; and execution of the distributed tasks is interrupted.

19. The computer-readable medium of claim 16, wherein designating the second portion is based on a default setting.

20. The method of claim 12, wherein assigning the second portion to be run in one of the synchronous execution mode or the asynchronous execution mode is based on a default setting.

21. A system for running a test, comprising:

a first computer for generating a test to test a system under test in a first environment, wherein generating includes:

the first computer designating a first portion of the test to be run in the first environment;

the first computer designating a second portion of the test to be run as a distributed test, and the first computer assigning the second portion to be run in one of a synchronous execution mode or an asynchronous execution mode;

the first computer distributing the second portion to a plurality of workers in a second environment, wherein the plurality of workers reside on the first computer or one or more other computers, the first computer or one or more other computers running the second portion with the plurality of workers in the second environment according to the execution mode selection; and the first computer or one or more other computers providing the results of running of the second portion to the first environment; wherein the second environment is not part of the first environment.

22. The system as set forth in claim 21, wherein generating further comprises the first computer generating the test in a test environment, and the first computer distributing the second portion of the test to the plurality of workers located in a distributed computing environment.

23. The system as set forth in claim 22, wherein the distributed computing environment provides a running status of running the second portion with the plurality of workers in the second environment according to the execution mode selection to the test environment.

24. The system as set forth in claim 22, wherein the first computer designating the second portion is based on a default setting.

25. The method of claim 21, wherein assigning the second portion to be run in one of the synchronous execution mode or the asynchronous execution mode is based on a default setting.

26. A system for running a test, comprising:

a test environment to generate a test to test a system under test in a first environment, designate a first portion of the test to be run in the first environment, designate a second portion of the test to be run as a distributed test, and assign the second portion of the test to be run in one of a synchronous execution mode or an asynchronous execution mode; and a distributed computing environment to receive the second portion and the assign the second portion of the test to be run in one of the synchronous execution mode or the asynchronous execution mode, distribute the second portion to a plurality of workers in the distributed computing environment, run the second portion with the plurality of workers in the distributed computing environment according to the execution mode selection, and provide the results of the running of the second portion to the first environment, wherein either:

the test environment and the distributed computing environment are implemented on a first computer or, the test environment is implemented on the first computer and the distributed computing environment is implemented on a second computer, or the test environment is implemented on the first computer, the distributed computing environment is implemented on the second computer, and the workers are implemented on a plurality of additional computers; wherein the second environment is not part of the first environment.

27. The system as set forth in claim 26, wherein the distributed computing environment provides a running status of the second portion, while it is run with the plurality of workers in the distributed computing environment according to the execution mode selection, to the test environment.

28. The system as set forth in claim 26, wherein after the test is generated by the test environment and received by the distributed computing environment, the test environment is exited.

29. The system as set forth in claim 28, wherein after the test environment is exited, the test environment is reopened for at least the distributed computing environment to provide a running status of the second portion, while it is run with the plurality of workers in the distributed computing environment according to the execution mode selection, to the test environment.

30. The system as set forth in claim 28, wherein after the test is finished, the test environment is reopened.

31. The system as set forth in claim 26, wherein the test environment designates the second portion based on a default setting.

32. The method of claim 26, wherein the second portion to be run in one of the synchronous execution mode or the asynchronous execution mode is assigned based on a default setting.

* * * * *

UNITED STATES PATENT AND TRADEMARK OFFICE
CERTIFICATE OF CORRECTION

| | | |
|---|---|---|
| PATENT NO. | : 7,809,988 B1 | Page 1 of 1 |
| APPLICATION NO. | : 11/647360 | |
| DATED | : October 5, 2010 | |
| INVENTOR(S) | : Portal et al. | |

It is certified that error appears in the above-identified patent and that said Letters Patent is hereby corrected as shown below:

At claim 26, column 14, line 46, replace ~~portion and the assign the second portion of the test to be~~ with portion and to assign the second portion of the test to be.

Signed and Sealed this

Fourteenth Day of December, 2010

David J. Kappos
*Director of the United States Patent and Trademark Office*